United States Patent [19]
Tien

[11] Patent Number: 5,730,342
[45] Date of Patent: Mar. 24, 1998

[54] MOBILE TELEPHONE FASTENING

[76] Inventor: Tse-Hsiung Tien, 12th Fl., No. 561, Mingshui Rd., Taipei, Taiwan

[21] Appl. No.: 827,805

[22] Filed: Apr. 11, 1997

[51] Int. Cl.$^6$ ........................................ A45F 5/00
[52] U.S. Cl. .................. 224/271; 224/669; 224/272; 224/197; 224/930; 24/597; 24/3.12
[58] Field of Search .................. 224/271, 272, 224/197, 198, 199, 269, 665–672, 930; 24/3.1, 3.12, 597, 641, 665, 669

[56] References Cited

U.S. PATENT DOCUMENTS

| | | | |
|---|---|---|---|
| 3,631,572 | 1/1972 | Lange | 24/665 |
| 4,624,034 | 11/1986 | Ishiguro et al. | 24/641 |
| 5,274,885 | 1/1994 | Hellweg | 224/272 |
| 5,375,749 | 12/1994 | Oliva | 224/272 |
| 5,620,120 | 4/1997 | Tien | 224/272 |
| 5,622,296 | 4/1997 | Pirhonen et al. | 224/272 |

*Primary Examiner*—Henry J. Recla
*Assistant Examiner*—Gregory M. Vidovich
*Attorney, Agent, or Firm*—Kirkpatrick & Lockhart LLP

[57] ABSTRACT

A mobile telephone fastening includes a cramping member and a gripping member. The cramping member has a base attached to a back of the mobile telephone and a buckle integrally extending from the base. The buckle has two opposed long edges and two opposed short edges. The gripping member includes an enclosure with a longitudinal recess, a press button received in the enclosure, a swing plate pivotedly engage with the enclosure, and an inverted-U-shaped flexure strip. The longitudinal recess has a circular space defined at a lower portion thereof. The swing plate has a protrusion extending into the longitudinal recess of the enclosure. In operation, the two opposed short edges of the buckle can be inserted into the recess and urge the protrusion of the swing plate to retract. When the buckle reaches the circular space of the recess and force applied on the protrusion by the buckle is removed, the protrusion will restore to project beyond the enclosure. At this moment, by rotating the mobile telephone by ninety degrees, the two opposed long edges of the buckle can be exactly received in the circular space, limited by the width of the recess and further retained by the protrusion. Accordingly, the mobile telephone can be engaged with the waistband by the mobile telephone fastening by double securing functions of the protrusion and the recess.

4 Claims, 4 Drawing Sheets

MOBILE TELEPHONE FASTENING

BACKGROUND OR THE INVENTION

1. Field of the Invention

The present invention relates to a mobile telephone fastening, and more particularly to a mobile telephone fastening which not only can secure the mobile telephone by a simple operation but also provide the mobile telephone with double fastening functions.

2. Description of Related Art

Mobile telephones are advanced communication tools and are commonly used all over the world. Though it is convenient for persons to communicate with each other, there is a disadvantage that such mobile telephones are not convenient to be carried. Conventionally, a mobile telephone, when carried, needs to be received in a cover 90, as shown in FIG. 5. The cover 90 has a flexure clamping plate 91 mounted on a back thereof by several rivets 92. The flexure clamping plate 91 clamps a belt or waistband 60 of a user so that the mobile telephone can be carried by the user. This way to fasten the mobile telephone has a disadvantage that the flexure clamping plate 91 may become loose after being used for a long period of time, thereby affecting the securement of the mobile telephone. A second disadvantage is that the mobile telephone may be separated from the waistband 60 if it is unexpectedly pushed off when sitting down for example, since the flexure clamping plate 91 has an unsatisfactory securing ability.

The present invention provides an improved mobile telephone fastening to mitigate and/or obviate the aforementioned problems.

SUMMARY OF THE INVENTION

One object of the present invention is to provide a mobile telephone fastening which not only can secure the mobile telephone by a simple operation but also provide the mobile telephone with double fastening functions.

In accordance with one aspect of the present invention, a mobile telephone fastening comprises a cramping member and a gripping member. The cramping member has a base attached to a back of the mobile telephone and a buckle integrally extending from the base. The buckle is configured to have two opposed long edges and two opposed short edges. The gripping member comprises an enclosure, a press button, a swing plate, and an inverted-U-shaped flexure strip. The enclosure has an outer face and an inner face. The outer face of the enclosure forms a longitudinal recess therein for receiving the buckle of the cramping member. The longitudinal recess defines an entrance at an upper portion thereof and a circular space at a lower portion thereof. The inner face of the enclosure has two longitudinal opposed conduits respectively defined in two side walls thereof, two channels respectively adjacent and parallel to each of the conduits, and a rectangular hole defined in a middle position thereof. The press button has two elongate side pieces respectively received in the two longitudinal opposed conduits and a first boss extending downwardly from a lower portion thereof. Each of the side pieces form a beveled edge at a bottom end thereof. The swing plate is pivotably engaged with the enclosure. The swing plate has a second boss formed on a top portion so that a spring can be mounted and compressed between the press button and the swing plate. The swing plate further has a protrusion extending through the rectangular hole of the enclosure and a pair of triangular lugs respectively extending from two side walls thereof to abut a corresponding beveled edge of the press button. The inverted-U-shaped flexure strip has a front portion engaged with a clamping plate and a rear portion received in the channels of the enclosure. The clamping plate is provided for gripping a waistband of a user.

In accordance with another aspect of the present invention, the enclosure further defines a plurality of elongate holes in the inner face thereof And the press button further forms a plurality of plug-in strips extending into the corresponding elongate holes of the enclosure to limit the movement of the press button.

In accordance with a further aspect of the present invention, the enclosure further defines a pair of through holes in the inner face thereof and the swing plate further has a pair of hooks respectively extending into the corresponding through holes of the enclosure, so that the swing plate can be pivoted with respect to the enclosure.

Other objects, advantages and novel features of the invention will become more apparent from the following detailed description when taken in conjunction with the accompanying drawings.

DETAILED DESCRIPTION OF PREFERRED EMBODIMENT

Figure 1:
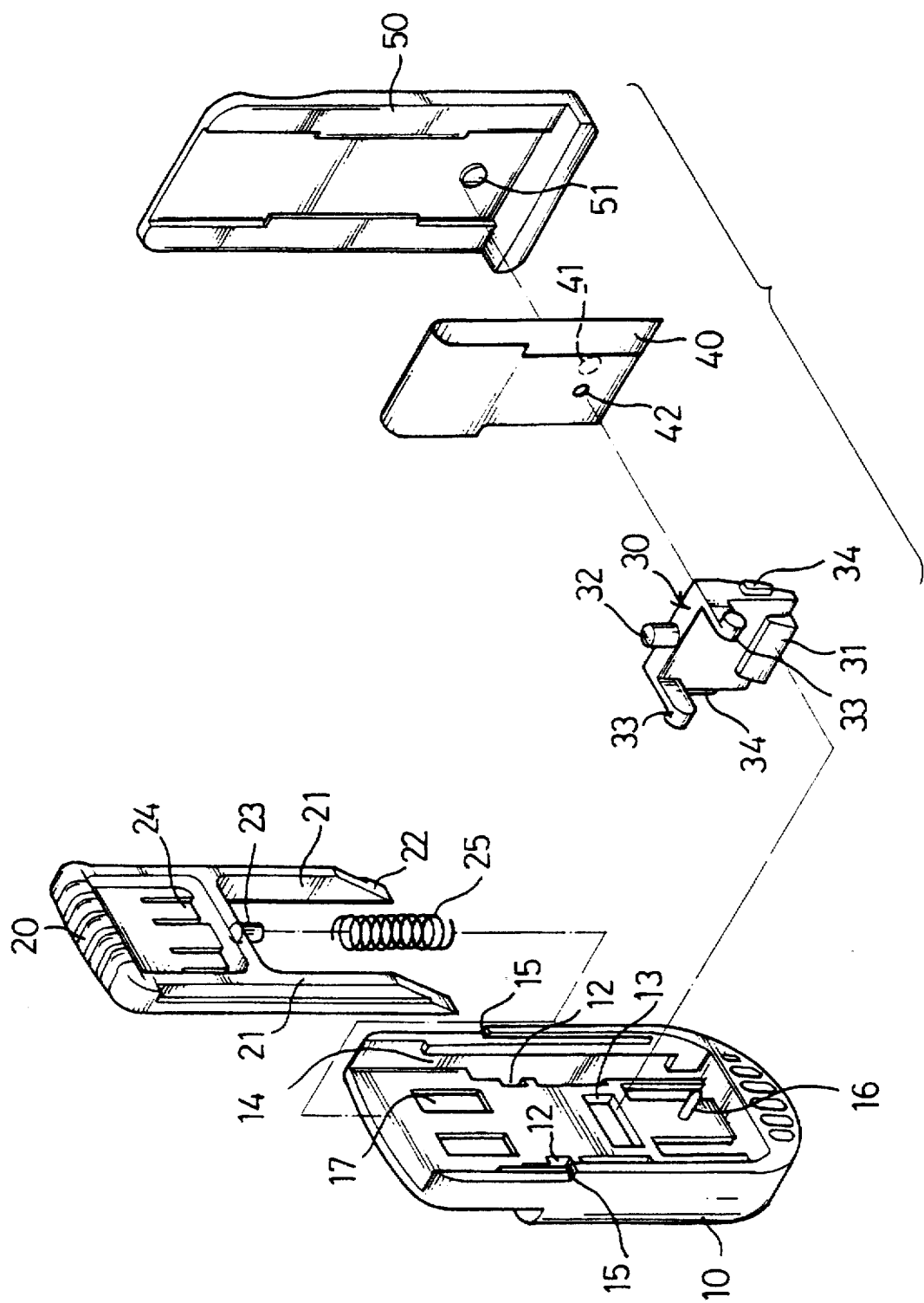
FIG. 1 is an exploded view showing elements of a gripping member of the mobile telephone fastening in accordance with the present invention.
Figure 2:
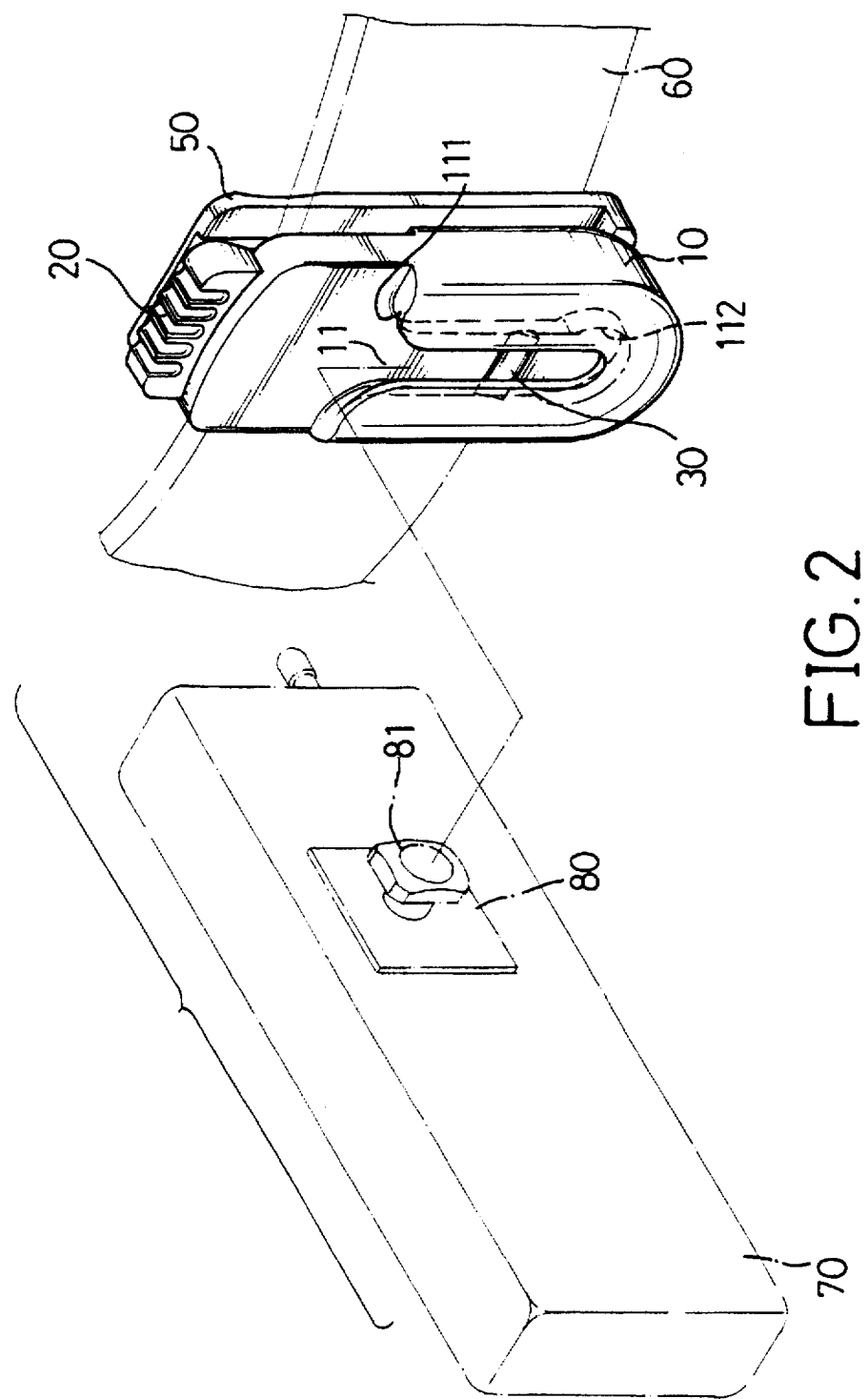
FIG. 2 is a perspective view showing a cramping member and the gripping member of a mobile telephone fastening in accordance with the present invention.

Referring to the figures and firstly to FIG. 2, a mobile telephone fastening in accordance with the present invention comprises a cramping member (not numbered) and a gripping member (not numbered) for gripping on a waistband 60 of a user. The cramping member has a base 80 attached to a back of a mobile telephone 70 and a buckle 81 integrally extending from the base 80. The buckle 81 is configured to have two opposed long edges, two opposed short edges and a neck (not numbered) connected to the base 80. Still referring to FIG. 2 and further to FIG. 1, the gripping member includes an enclosure 10, a press button 20, a swing plate 30, an inverted-U-shaped flexure strip 40 and a clamp plate 50.

The enclosure 10 defines an outer surface and an inner surface (both not numbered). The outer face of the enclosure 10 defines a longitudinal recess 11 therein for receiving the buckle 81 of the cramping member. The longitudinal recess 11 defines both an entrance 111 at an upper portion thereof and a circular space 112 at a lower portion thereof, as shown by the dotted line in FIG. 2. It is to be noted that each of the opposed short edges of the buckle 81 have a length substantially the same as a width of the recess 11 and the opposed long edges of the buckle 81 have a length substantially the same as a diameter of the circular space 112 of the recess 11. The inner surface of the enclosure 10 includes a middle wall and two side walls. A pair of through holes 12, a pair of longitudinal opposed conduits 14, and a pair of channels 15 are subsequently and respectively defined in the two side walls, wherein each of the pair of channels 15 is adjacent and parallel to each of the conduits 14. A rectangular hole 13 defined in a middle position of the middle wall and two elongate holes 17 are defined in an upper portion of the middle wall. The enclosure 10 further has a post 16 extending integrally from the inner surface thereof.

The press button 20 is configured substantially rectangular and has two elongate side legs 21 extending therefrom to be received in the pair of longitudinal opposed conduits 14 of the enclosure 10. Each of the side legs 21 of the press button 20 forms a beveled edge 22 at a distal end thereof. The press button 20 further has a first boss 23 extending from a lower portion thereof for a spring 25 to be mounted thereon and two plug-in strips 24 to correspond to the two elongate holes 17 of the enclosure 10.

The swing plate 30 has a second boss 32 formed on a top portion thereof so that the spring 25 can be mounted and compressed between the press button 20 and the swing plate 30, when the spring 25 is disposed between the first boss 23 and the second boss 32. The swing plate 30 further has a pair of hooks 33 respectively received in the pair of through holes 12 of the enclosure 10 so that the swing plate 30 can be pivotably engaged with the enclosure 10. Also, a pair of triangular lugs 34 respectively extend from two sides of the swing plate 30 to abut a respective beveled edge 22 of the leg 21 of the press button 20. A protrusion 31 is formed on a lower portion of the swing plate 30 to extend through the rectangular hole 13 of the enclosure 10.

The flexure strip 40 is shaped as an inverted "U" and composed of a front portion and a rear portion. The rear portion of the flexure strip 40 is received in the channels 15 of the enclosure 10 and defines a small hole 42 therein for the post 16 of the enclosure 10 to extend therethrough. The front portion of the flexure strip 40 is engaged with the clamping plate 50 and defines a large hole 41 therein. The clamping plate 50 has a projection 51 formed thereon to snappingly extend into the large hole 41 and thus secure the clamping plate 50 to the flexure strip 40.

In assembly, the two side legs 21 of the press button 20 are priorly inserted into the conduits 14 of the enclosure 10 and the two plug-in strips 24 are respectively inserted into the two elongate holes 17 of the enclosure 10 to limit movement of the press button 20. Then the pair of hooks 33 of the swing plate 30 respectively extend into the pair of through holes 12 of the enclosure 10 to act as a pivot and the protrusion 31 extends through the rectangular hole 13 of the enclosure 10. Thereafter, the spring 25 is mounted between the first boss 23 and the second boss 32. Therefore, the press button 20 can move resiliently with respect to the enclosure 10 and drive the swing plate 30 to swing with respect to the enclosure 10. Next, the rear portion of the flexure strip 40 is inserted into the channels 15 of the enclosure 10 to partly cover the enclosure 10. The post 16 of the enclosure 10 extends through the small hole 42 of the flexure strip 40 and is deformed by a thermal treatment, thereby securely engaging the enclosure 10 with the flexure strip 40. Finally, the front portion of the flexure strip 40 is engaged with the clamping plate 50 and the large hole 41 snappingly receives the projection 51. In this way, a combined structure of the gripping member as shown in FIG. 2 is obtained.

Figure 3:
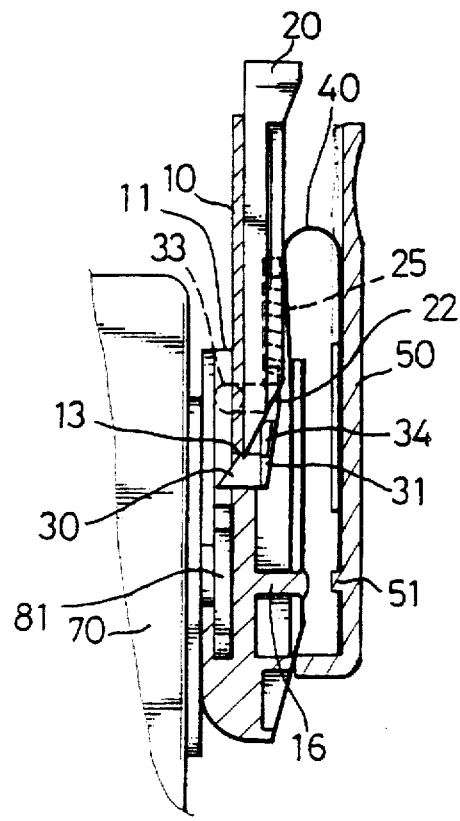
FIG. 3 is a side cross-sectional view showing the combined structure of the gripping member of the mobile telephone fastening in accordance with the present invention.

The operation of the mobile telephone fastening now will be described with a reference to FIG. 3 and FIG. 4. Firstly, the mobile telephone 70 is engaged with the gripping member via its two opposed short edges being inserted into the recess 11 from the entrance 111 of the enclosure 10. During the insertion of the buckle 81 into the recess 11, the two opposed short edges will urge the protrusion 31 to retract. When the buckle 81 reaches to the circular space 112 of the recess 11 and force applied on the protrusion 31 by the buckle 81 is removed, the protrusion 31 will return to project beyond the enclosure 10 due to an elastic force provided by the spring 25. At this moment, by rotating the mobile telephone 70 by ninety degrees, the two opposed long edges of the buckle 81 can be exactly received in the circular space 112, limited by the width of the recess 11 and further retained by the protrusion 31. Accordingly, the mobile telephone 70 can be engaged with the waistband 60 by the mobile telephone fastening by double securing functions of the protrusion 31 and the recess 11.

Figure 4:
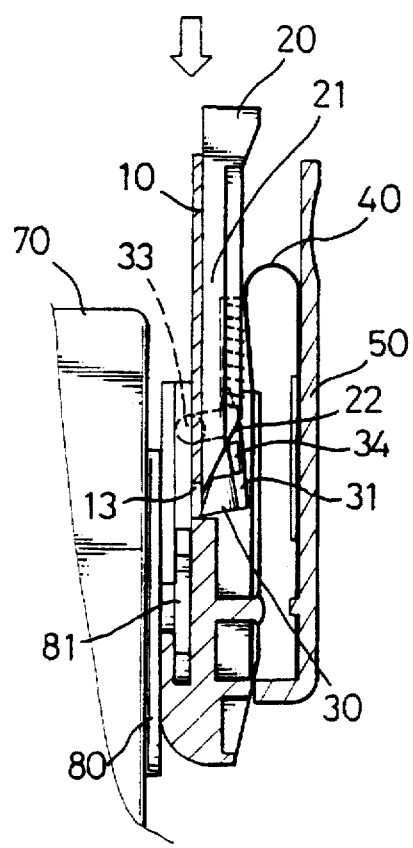
FIG. 4 is a part cross-sectional side view showing the operation of a press button of the gripping member of the mobile telephone fastening in accordance with the present invention.
Figure 5:
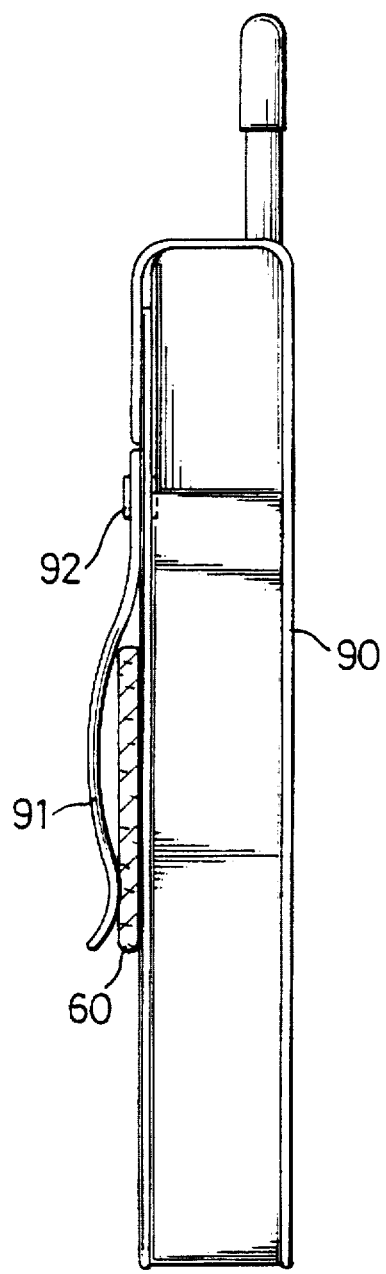
FIG. 5 is a side view showing a conventional mobile telephone fastening.

With a reference to FIG. 4, when the mobile telephone 70 is to be removed from the fastening, by pressing down the press button 20, the two side legs 21 will be driven to press down and the two beveled edges 22 thereof will urge the pair of triangular lugs 34 of the swing plate 30 and drive the swing plate 30 to rotate in a counterclockwise direction to retract the protrusion 31. Then by reversing the above mentioned insertion process, the mobile telephone 70 can be taken out from the fastening.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mobile telephone fastening comprising:
   a cramping member having a base adapted to be attached to a back of the mobile telephone and a buckle integrally extending from the base, said buckle having two opposed long edges and two opposed short edges; and
   a gripping member including:
   an enclosure having an outer face and an inner face, said outer face forming a longitudinal recess therein for receiving said buckle of the cramping member, said longitudinal recess defining an entrance at an upper portion thereof and a circular space at a lower portion thereof, said inner face having two longitudinal opposed conduits respectively defined in two side walls thereof, two channels respectively adjacent and parallel to each of the conduits, and a rectangular hole defined in a middle position thereof;
   a press button having two elongate side pieces respectively received in the two longitudinal opposed conduits and a first boss extending downwardly from a lower portion thereof, each of the side pieces forming a beveled edge at a bottom end thereof;
   a swing plate pivotably engaged with the enclosure, said swing plate having a second boss formed on a top portion so that a spring can be mounted and compressed between the press button and the swing plate, said swing plate further having a protrusion extending through the rectangular hole of the enclosure and a pair of triangular lugs respectively extending from two side walls thereof to abut a corresponding beveled edge of the side pieces of the press button; and an inverted-U-shaped flexure strip having a front portion engaged with a clamping plate and a rear portion received in the channels of the enclosure, said clamping plate adapted to grip a waistband of a user.

2. A mobile telephone fastening as claimed in claim 1, wherein said enclosure further defines a plurality of elongate holes in the inner face thereof and said press button further forms a plurality of plug-in strips extending into the corresponding elongate holes of the enclosure to limit the movement of the press button.

3. A mobile telephone fastening as claimed in claim 1, wherein said enclosure further defines a pair of through holes in the inner face thereof and the swing plate further has a pair of hooks respectively extending into the corresponding through holes of the enclosure, so that the swing plate can be pivoted with respect to the enclosure.

4. A mobile telephone fastening as claimed in claim 1, wherein said enclosure further has a post extending from the inner face thereof and the inverted-U-shaped flexure strip defines a small hole at the front portion thereof for said post to securely extend therethrough.

* * * * *